(12) United States Patent
Cruanes et al.

(10) Patent No.: US 6,954,776 B1
(45) Date of Patent: Oct. 11, 2005

(54) ENABLING INTRA-PARTITION PARALLELISM FOR PARTITION-BASED OPERATIONS

(75) Inventors: Thierry Cruanes, Redwood City, CA (US); Benoit Dageville, Redwood Shores, CA (US); Patrick A. Amor, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 721 days.

(21) Appl. No.: 09/851,065

(22) Filed: May 7, 2001

(51) Int. Cl.[7] .......................... G06F 15/16; G06F 9/46
(52) U.S. Cl. ..................... 709/201; 709/221; 709/224; 718/100
(58) Field of Search ................................ 718/100, 102; 707/2, 6, 100, 102, 1, 3, 10, 16, 28, 205; 709/224, 229, 200, 201, 221

(56) References Cited

U.S. PATENT DOCUMENTS

| | | | |
|---|---|---|---|
| 4,855,903 A * | 8/1989 | Carleton et al. ............ 709/248 |
| 5,687,369 A * | 11/1997 | Li .............................. 707/203 |
| 5,799,149 A * | 8/1998 | Brenner et al. ............. 709/201 |
| 5,854,896 A * | 12/1998 | Brenner et al. ............. 709/221 |
| 5,878,409 A * | 3/1999 | Baru et al. ...................... 707/2 |
| 5,881,227 A * | 3/1999 | Brenner et al. ............. 709/220 |
| 5,903,771 A * | 5/1999 | Sgro et al. .................... 712/20 |
| 5,941,943 A * | 8/1999 | Brenner et al. ............. 709/201 |
| 5,995,904 A * | 11/1999 | Willen et al. ................. 702/14 |
| 6,115,131 A * | 9/2000 | Payne ........................ 358/1.14 |
| 6,169,989 B1 * | 1/2001 | Eichstaedt et al. .......... 707/100 |
| 6,282,570 B1 * | 8/2001 | Leung et al. ................ 709/224 |
| 6,374,403 B1 * | 4/2002 | Darte et al. ................. 717/161 |
| 6,377,265 B1 * | 4/2002 | Bong .......................... 345/505 |
| 6,415,286 B1 * | 7/2002 | Passera et al. .................. 707/6 |
| 6,438,747 B1 * | 8/2002 | Schreiber et al. ........... 717/160 |
| 6,505,187 B1 * | 1/2003 | Shatdal .......................... 707/2 |
| 6,507,947 B1 * | 1/2003 | Schreiber et al. ........... 717/160 |
| 6,510,428 B2 * | 1/2003 | Tsuchida et al. ............... 707/6 |
| 6,564,221 B1 * | 5/2003 | Shatdal ....................... 707/102 |
| 6,665,684 B2 * | 12/2003 | Zait et al. ................... 707/102 |

\* cited by examiner

*Primary Examiner*—Majid Banankhah
(74) *Attorney, Agent, or Firm*—Hickman Palermo Truong & Becker, LLP (57) ABSTRACT

Techniques are provided for increasing the degree of parallelism without incurring overhead costs associated with inter-nodal communication for performing parallel operations. One aspect of the invention is to distribute-phase partition-pairs of a parallel partition-wise operation on a pair of objects among the nodes of a database system. The -phase partition-pairs that are distributed to each node are further partitioned to form a new set of-phase partition-pairs. One -phase partition-pair from the set of new-phase partition-pairs is assigned to each slave process that is on a given node. In addition, a target object may be partitioned by applying an appropriate hash function to the tuples of the target object. The parallel operation is performed by broadcasting each tuple from a source table only to the group of slave processes that is working on the static partition to which the tuple is mapped.

24 Claims, 5 Drawing Sheets

FIG. 1

| PRODUCTID H1 222 | PRODUCTID H2 224 | PRODUCTID H3 226 | PRODUCTID H4 228 |

TABLE B 220

| PRODUCTID H1 204 | PRODUCTID H2 206 | PRODUCTID H3 208 | PRODUCTID H4 210 |

TABLE A 202

ENABLING INTRA-PARTITION PARALLELISM FOR PARTITION-BASED OPERATIONS

FIELD OF THE INVENTION

The present invention relates to computer systems and, more particularly, to techniques for using an increased degree of parallelism when performing parallel operations on partitioned objects within computer systems.

BACKGROUND OF THE INVENTION

To fully utilize the computing power of a multi-processing system, a large task may be divided into smaller tasks ("work granules") that are then distributed to processes ("slave processes") running on one or more processing nodes. Each node in a multi-processing system may contain multiple processors and multiple concurrent processes. Thus, with parallel execution, multiple parallel server processes work together simultaneously to complete the large task. For example, the task may be the processing of a single SQL statement.

A SQL statement comprises either a query or a combination of a query and data manipulation operations to be performed on a database. The query portion and the data manipulation operations are herein referred to as "operations". An "operation" performed in a parallel execution environment is hereafter referred to as a "parallel operation".

The number of slave processes assigned to perform a single parallel operation is referred to as the degree of parallelism (DOP) for that operation. Thus, the higher the degree of parallelism, the more slave processes are assigned to work on the operation.

A task may be adapted for a parallel execution environment in order to use as many slave processes as are available in the multi-processing system. However, the process of breaking the task up must be performed efficiently or the cost of breaking up the task into work granules and distributing the work granules to the slave processes may exceed the benefit gained by performing the operation in parallel.

The task of selecting rows that contain a particular value from a database table may be adapted for a parallel execution environment by having the task broken up into work granules, where the work granules correspond to "partitions" of the database table. Each partition of the table has a subset of the rows in the table. The process of dividing a table into a set of partitions is referred to as "partitioning" the table. In another approach, the task may be broken up for a parallel execution environment by simply assigning each slave process a contiguous block of data by specifying the row identification range associated with each contiguous block of data.

One type of partitioning is hash partitioning. According to hash partitioning, one or more values from each row of the database table that is to be partitioned are applied to a hash function to produce a hash value. A separate partition or hash bucket is established for each possible hash value produced by the hash function, and rows that have values that hash to a particular value are stored within the partition that is associated with that hash value.

Hash partitioning increases the efficiency of processing certain types of queries. For example, when a query selects all rows that contain a particular value in the column that is used to perform the hash partitioning, the database server can apply the value in the query to the hash function to produce a hash value, and then limit the scan of the table to the partition that corresponds to the hash value thus produced.

For example, assume that a join is to be performed between two equi-joined tables, A and B, on a cluster of two nodes X and Y with a DOP of 8. Assume further that, to achieve the DOP of 8, 4 slave processes on each nodes X and Y are assigned to the task. If a hash-join method is selected to accomplish the join, then the rows from tables A and B are distributed into 8 hash partitions. However, the cost of redistributing the rows into hash partitions may be computationally expensive.

Assume that each of the eight slave processes is responsible for processing the rows of one of the eight hash partitions. The distribution of the rows from Tables A and B into 8 hash partitions may involve a significant amount of inter-node communication between the two nodes. For example, a slave process from node X may read a row from table A, determine that the hash partition for that row is assigned to a slave on node Y, and send the row to a hash partition that is located at node Y. The drawback of inter-nodal communication is that inter-nodal communication is typically computationally expensive and high latency relative to intra-node communication.

Figure 1:
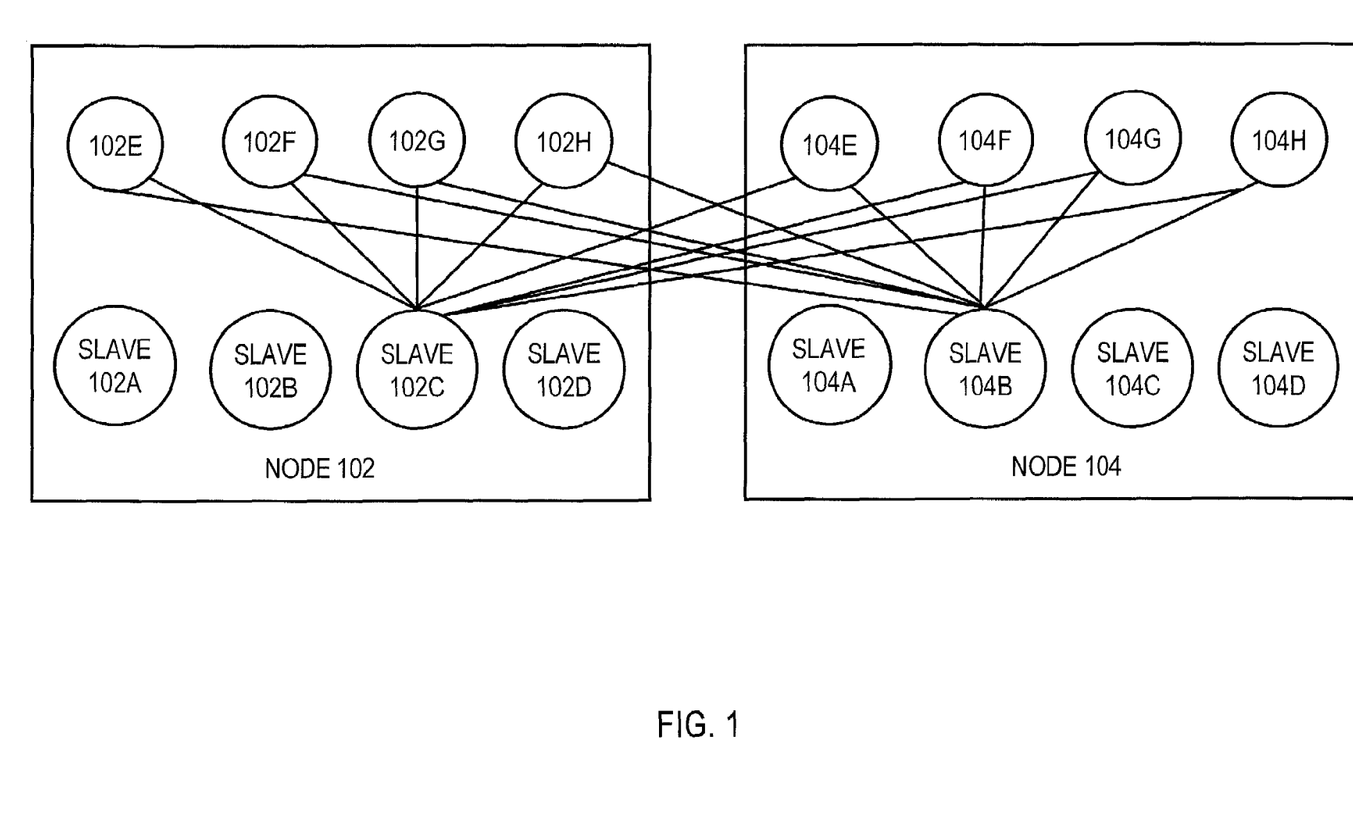
FIG. 1 is a block diagram that illustrates a hash join on a two-node cluster.

FIG. 1 is a block diagram that illustrates a hash join on a two-node cluster with a DOP of 8. The two nodes in the cluster are represented by node 102 and node 104. Node 102 has 4 slave processes 102*a*, 102*b*, 102*c*, 102*d*. Node 104 has 4 slave processes 104*a*, 104*b*, 104*c*, 104*d*.

The slave processes 102*a–d* and 104*a–d* read rows from Tables A and B and send them to the appropriate hash partition. In the example shown in FIG. 1, there are eight hash partitions. Four hash partitions 102*e–h* are being handled by node 102. Four hash partitions 104*e–h* are being handled by node 104.

Assume that node 102 is able to directly access Table A and that node 104 is able to directly access Table B. In order to perform an equi-join between Tables A and B using the hash-join method, the rows from Tables A and B are hashed by applying the same hash function to both Tables A and Table B. Slave processes 102*a–d* read the hashed rows from Table A and send the hashed rows to the appropriate hash partition. Similarly, slave processes 104*a–d* read the hashed rows from Table B and send the hashed rows to the appropriate hash partition.

In FIG. 1, for the purpose of simplicity, only slave process 102*c* of node 102 and slave process 104*b* of node 104 are shown as sending hashed rows to hash partitions 102*e–f*, and 104*e–f*. As indicated in FIG. 1, distribution of hashed rows into hash partitions may involve inter-nodal communication when each of the slave processes 102*a–d*, and 104*a–d* is performing the distribution of the hashed rows from Tables A and B respectively.

Figure 2:
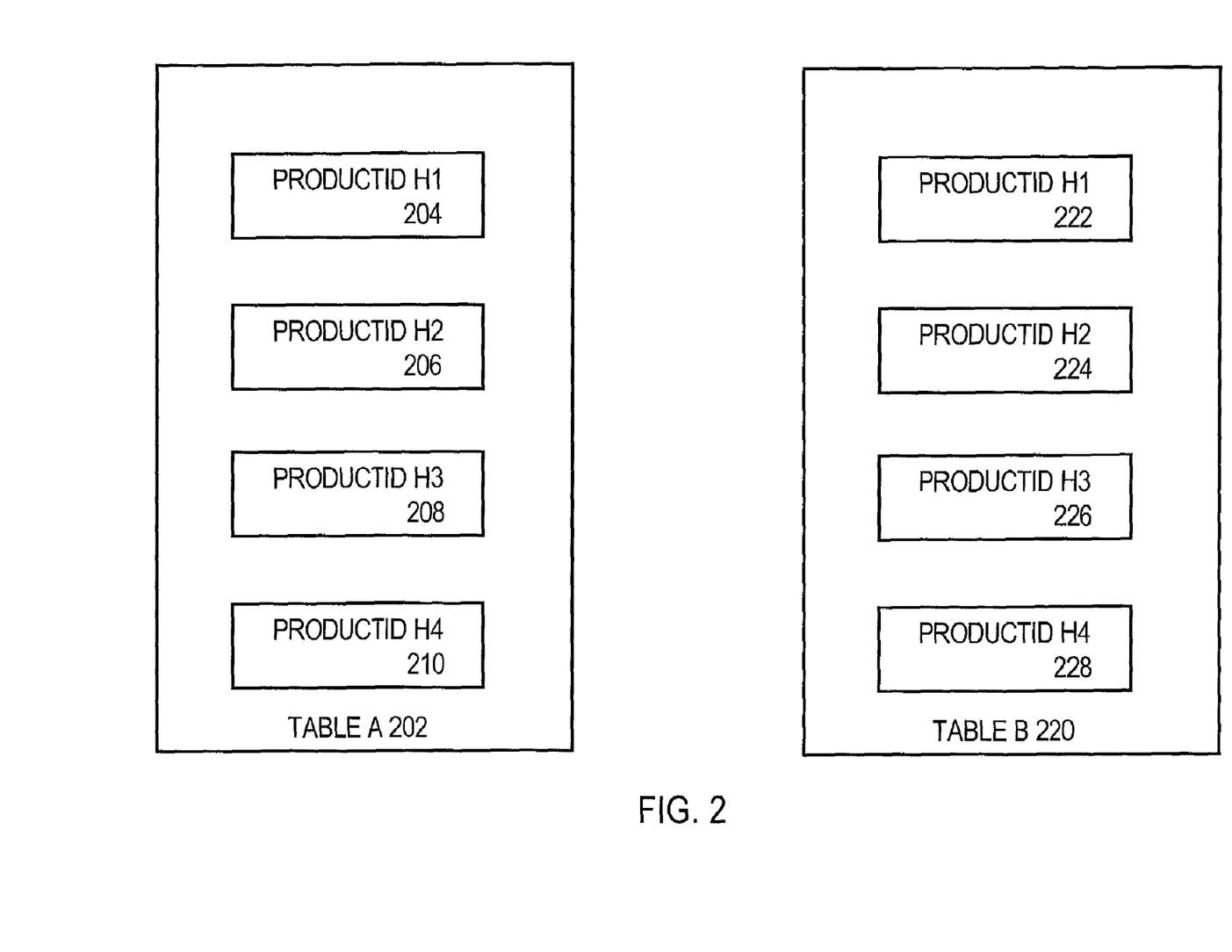
FIG. 2 is a block diagram that illustrates a database system in which both tables of the join operation have pre-existing partitions.

An alternate method of performing parallel execution of the above equi-join operation is by using pre-existing partitions of the objects. For example, assume that Tables A and B have pre-existing partitions as shown in FIG. 2. FIG. 2 is a block diagram that illustrates a database system in which both tables of the join operation have pre-existing partitions. The rows from each pair (one partition from each table) of the pre-existing partitions may be sent to a separate slave process for performing the equi-join operation. The pre-existing partitions of an object are herein referred to as "static partitions".

In FIG. 2, Table A 202 and Table B 220 have identical static partitions based on "productid". The static partitions of Table A 202 are productid H1 204, productid H2 206, productid H3 208, and productid H4 210. The static partitions of Table B 220 are productid H1 222, productid H2 224, productid H3 226, and productid H4 228.

Productid H1 204 holds all rows in Table A that have productid values that fall in a particular range or hash to a particular hash value. Productid H1 222 holds all rows in Table B that have productid values that fall into that same particular range or hash to that same particular hash value. Hence, in a join between Tables A and B in which productid is the join key, rows in H1 204 can only possibly join with rows in H1 222, and visa versa. Consequently, productid H1 204 and productid H1 222 make a "partition pair". Similarly, H2 206 and H2 224 make a partition pair; H3 208 and H3 226 make a partition pair; and H4 210 and H4 228 make a partition pair.

The rows that belong to a partition pair may be sent to a slave process for performing the parallel join operation. When the parallel join operation that has to be performed joins the Tables A and B based on the productid key, there is no need to re-distribute the data from Tables A and B into hash partitions. Thus, by using the static partitions of Tables A and B, the overhead associated with distributing the data into subsets for distribution to slave processes may be avoided.

Parallel join operations in which the joined objects are partitioned in an identical manner based on the join key, where the data is divided and distributed based on static partitions, are referred to herein as full parallel partition-wise joins.

The drawback of using static partitions of objects in parallel processing is that the DOP is limited by the number of static partitions of the objects because only one slave process is assigned each pair of static partitions. For example, tables A 202 and B 220 in FIG. B are each divided into four partitions, so the maximum DOP that may be used in a join operation between the two tables is four, even though resources are available to achieve a much higher DOP.

Based on the foregoing, there is a clear need for a mechanism for increasing the degree of parallelism without incurring overhead costs associated with inter-nodal communication for performing parallel operations.

SUMMARY OF THE INVENTION

Techniques are provided for increasing the degree of parallelism used to perform an operation without incurring overhead costs associated with inter-nodal communication. One aspect of the invention is to distribute partition-pairs of a parallel partition-wise operation on a pair of objects among the nodes of a database system. The partition-pairs that are distributed to each node are further partitioned to form a new set of partition-pairs. One partition-pair from the set of new partition-pairs is assigned to each slave process that is on a given node.

In addition, a target object may be partitioned by applying an appropriate hash function to the tuples of the target object. The parallel operation is performed by sending each tuple from a source table only to the group of slave process that is working on the static partition to which the tuple is mapped.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques for performing parallel operations are provided. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hybrid Parallel Execution

Figure 3:
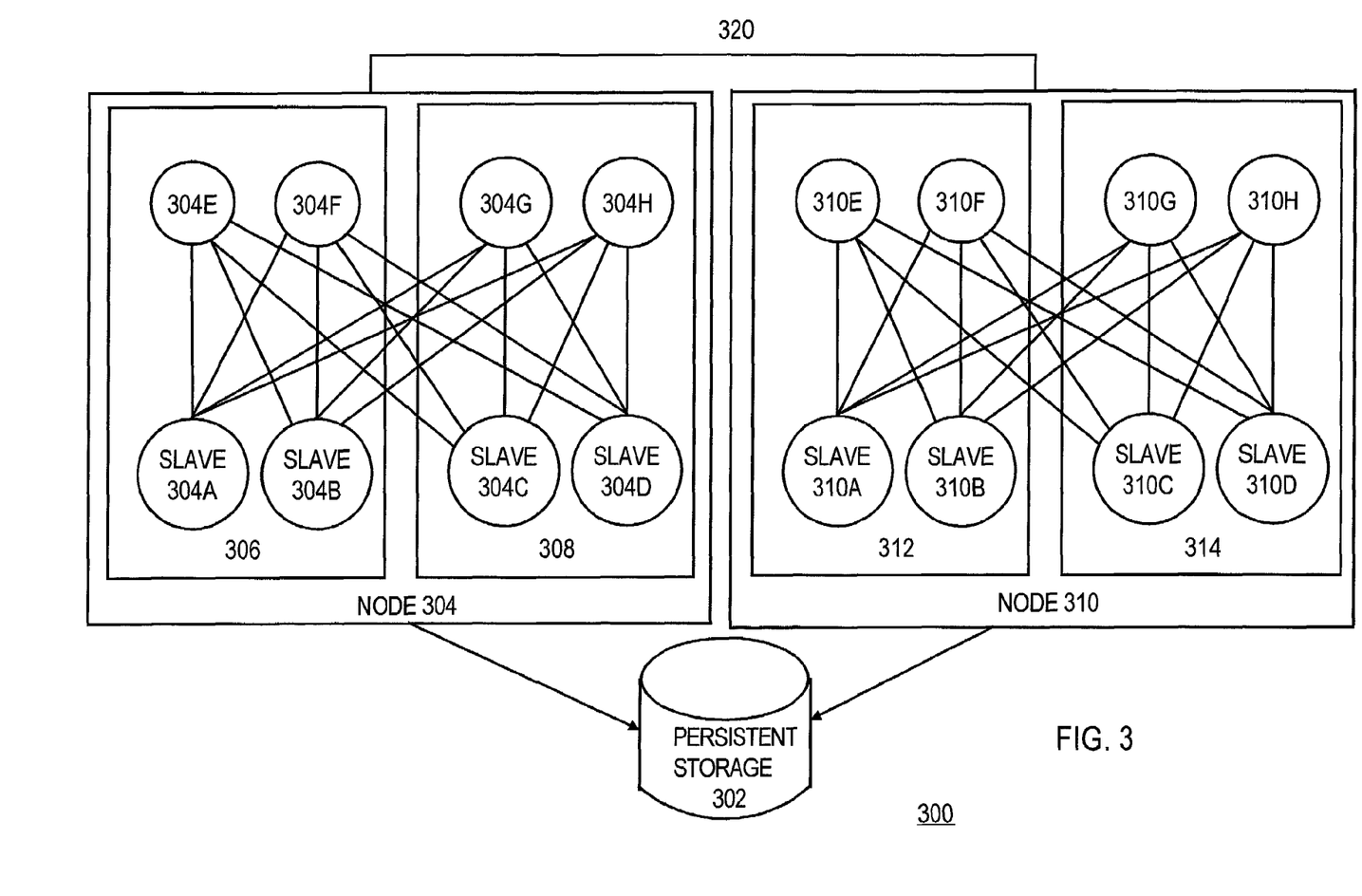
FIG. 3 is a block diagram that illustrates a shared disk database system.

For the purpose of explanation, certain embodiments of the invention are described in the context of a shared disk database system and a full parallel partition-wise operation. However, embodiments of the invention are not limited to a shared disk database system or a full parallel partition-wise operation. In certain embodiments a partial parallel partition-wise operation may be involved. Full and partial parallel partition-wise operations are described in U.S. patent application Ser. No. 09/405,980 entitled "METHOD AND SYSTEM FOR DIAGNOSTIC PRESERVATION OF THE STATE OF A COMPUTER SYSTEM" filed by Mohamed Zait, Benoit Dageville, Andre Kruglikov, and Gianfranco Putzolu on Sep. 27, 1999, the contents of which is incorporated herein by reference. FIG. 3 is a block diagram that illustrates a shared disk database system. In FIG. 3, shared disk system 300 comprises two nodes 304, 310, and persistent storage 302, which may include, for example, numerous magnetic disks. Nodes 304, and 310 share persistent storage 302. The nodes communicate through the interconnect 320. Each node comprises a dynamic memory (not shown) and one or more processors (not shown).

For the purpose of explanation, it shall be assumed that Tables A and B are stored on persistent storage 302, and that parallel execution of an equi-join operation is to be performed on Tables A and B. Assume that, as shown in FIG. 2, Table A has 4 static partitions that are identical to the 4 static partitions of Table B. Assume that the static partitions of Tables A and B are based on the join key of the equi-join operation. Thus, there are 4 partition-pairs to be assigned to slave processes for performing the equi-join operation.

Typically, work performance is improved when the slave processes in the shared disk system have equal work to avoid workload skewing. Work skewing occurs when some of slave processes perform significantly more work than other slave processes. In the present example, since there are a total of 4 partition-pairs, 2 partition-pairs may be assigned to node 304, and 2 partition-pairs to node 310. Assume that nodes 304, and 310 each have 4 CPUs. Thus, if all available resources are used, the maximum DOP that is possible for the equi-join operation in the present example is 8 because each node is capable of spawning 4 slave processes to perform the equi-join operation. However, since each node has only 2 partition-pairs, then using conventional techniques the maximum DOP is 4 because each partition-pair is assigned to one slave process.

Techniques are provided herein for increasing the maximum DOP of a parallel operation above the number of partition-pairs by subdividing one or more of the partition-pairs. The process of subdividing one or more partition-pairs is referred to herein as second-phase partitioning because it involves further partitioning data that has already been partitioned. The partition-pairs that are subdivided are referred to herein as first-phase partition-pairs, and the partition-pairs that result from the subdivision process are referred to herein as second-phase partition-pairs.

For example, in order to achieve the maximum DOP of 8, each first-phase partition-pair may be further subdivided into as many subdivisions as are needed to utilize the CPUs that are available at each node. For example, node 304 has 4 CPUs and thus may spawn 4 slave processes. Each of the 2 first-phase partition-pairs on node 304 may be further subdivided into 2 second-phase partition-pairs using hash partitioning, resulting in 4 hash second-phase partitions on node 304.

In FIG. 3, node 304 has first-phase partition-pairs 306 and 308. The data in first-phase partition-pair 306 is subdivided into second-phase hash partitions 304e, and 304f. The data in first-phase partition-pair 308 is subdivided into second-phase hash partitions 304g, and 304h. Hash partitioning of the first-phase partition-pairs 306 and 308 is performed by slave processes 304a, 304b, 304c, 304d that read data from first-phase partition-pairs 306 and 308 and distribute the data into the second-phase hash partitions 304e, 304f, 304g, 304h. Each of the four second-phase hash partitions is then assigned to a slave process at node 304 for performing the equi-join operation.

Similarly, node 310 has first-phase partition-pairs 312 and 314. The data in first-phase partition-pair 312 is subdivided into second-phase hash partitions 310e, and 310f. The data in first-phase partition-pair 314 is subdivided into second-phase hash partitions 310g, and 310h. Hash partitioning of the first-phase partition-pairs 312 and 314 is performed by slave processes 310a, 310b, 310c, 310d that read data from first-phase partition-pairs 312 and 314 and distribute the data into the second-phase hash partitions 310e, 310f, 310g, 310h. Each second-phase hash partition is then assigned to a slave process at node 310 for performing the equi-join operation.

The second-phase hash partitioning is performed locally at each node, resulting in a relatively low intra-nodal distribution cost. Thus, the second-phase partitioning results in no additional communication between the nodes, thus avoiding the relatively high inter-nodal distribution cost. Thus, the DOP used to perform a partition-wise operation is increased while minimizing the distribution cost of subdividing the data from the objects on which the partition-wise operation is to be performed.

Local Distribution Cost

The increase of the DOP corresponding to performing a partition-wise operation as described herein is achieved by substituting inter-nodal distribution costs with intra-nodal distribution costs. In order to justify the substitution of inter-nodal distribution cost with intra-nodal distribution cost, according to certain embodiments, the number of slave processes should be greater than the number of static partitions in the objects on which the partition-wise operation is to be performed. According to one embodiment of the invention, the number of slave processes should be greater than the number of static partitions by at least one order of magnitude. For example, if the number of static partitions of an object is $2^n$, then the number of slave processes that are available to perform the partition-wise operation should be at least $2^{n+1}$.

Locality of Data

The time it takes for a process on a particular node to access a particular set of data depends on the location of the data with respect to the node. In general, the closer the data is to the processors in a node, the less time and system overhead it will take for the slave processes running on the processors to access the data. In certain embodiments of the invention, the first-phase partition-pairs of a partition-wise operation are initially distributed to the nodes of a database system according to the node affinity with respect to the first-phase partition-pair. A node is said to possess affinity for a disk if a node can access the disk directly. Thus, a node has affinity to a particular first-phase partition-pair if the first-phase partition-pair is located at the disk at which the node can access directly. After the initial distribution of first-phase partition-pairs, in the next round of distribution of the remaining first-phase partition-pairs, first-phase partition-pairs are distributed to nodes that have available slave processes to operate on the first-phase partition-pairs for the partition-wise operation.

Figure 4:
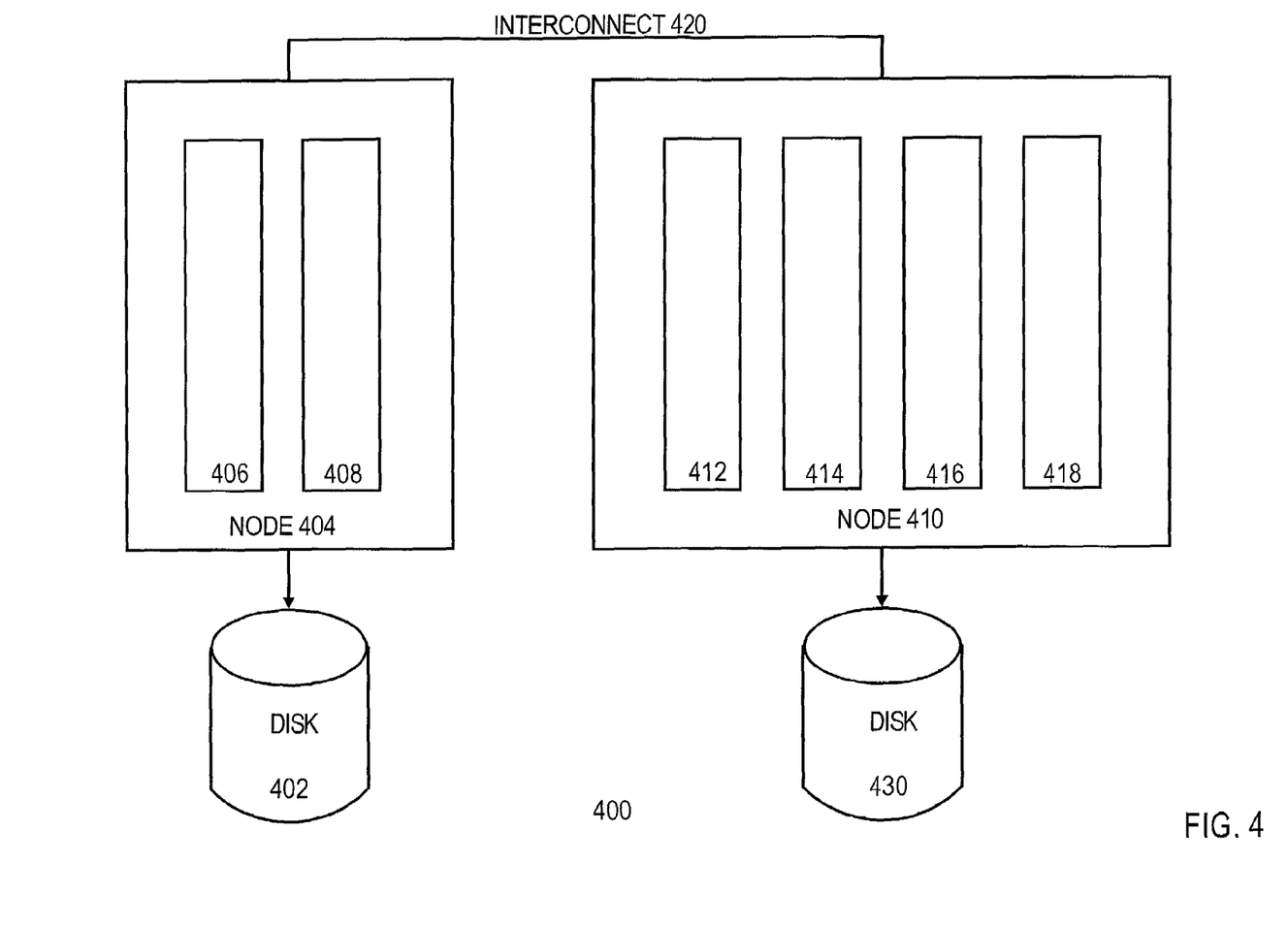
FIG. 4 is a block diagram that illustrates a shared-nothing database system.

For example, assume that parallel execution of an equi-join operation is to be performed on Tables D and E. Assume that Table D has 6 static partitions that are identical to the 6 static partitions of Table E. Assume that the static partitions of Tables D and E are based on the join key of the equi-join operation. Thus, there are 6 first-phase partition-pairs to be assigned to slave processes for performing the equi-join operation. FIG. 4 is a block diagram that illustrates a shared-nothing database system. System 400 comprises nodes 404 and 410. System 400 is a shared-nothing database system because node 404 has its own disk 402 that may not be directly accessed by node 410. Likewise, node 410 has its own disk 430 that may not be directly accessed by node 404. Nodes 404 and 410 communicate through interconnect 420.

Assume that node 404 has 2 available slave processes and node 410 has 4 available slave processes. Further assume that first-phase partition-pairs 406, 408, 412, and 414 are stored at disk 402 and first-phase partition-pairs 416 and 418 are stored at disk 430. During the initial distribution of first-phase partition-pairs, first-phase partition-pairs 406, 408 are assigned to node 404 and first-phase partitions-pairs 416, 418 are assigned to node 410 for reasons of node affinity. In the next round of distribution, the remaining first-phase partition-pairs 412, 414 are distributed to node 410 because node 410 has available slave processes to operate on the first-phase partition-pairs 412, 414 for the equi-join operation.

Broadcast

Assume that a join operation is to be performed between source Table S and target Table T. Typically, in the context of a normal broadcast distribution method, the source Table S is broadcast to all slave processes that are performing the join operation. Assume that Target Table T is statically partitioned. A slave process may then be assigned to each partition. In one embodiment of the invention, the join operation is performed by sending each tuple from source Table S only to the group of slave processes that is working on the static partition to which the tuple is mapped rather than broadcasting the entire Source Table S to all the slaves. Thus, the cost of communication is reduced because all tuples are not broadcasted to all slave processes. Additional cost savings are realized due to the reduced amount data that each slave process has to process. Therefore this distribution method is not only useful in a multimode architecture but also on a single node architecture.

Hardware Overview

Figure 5:
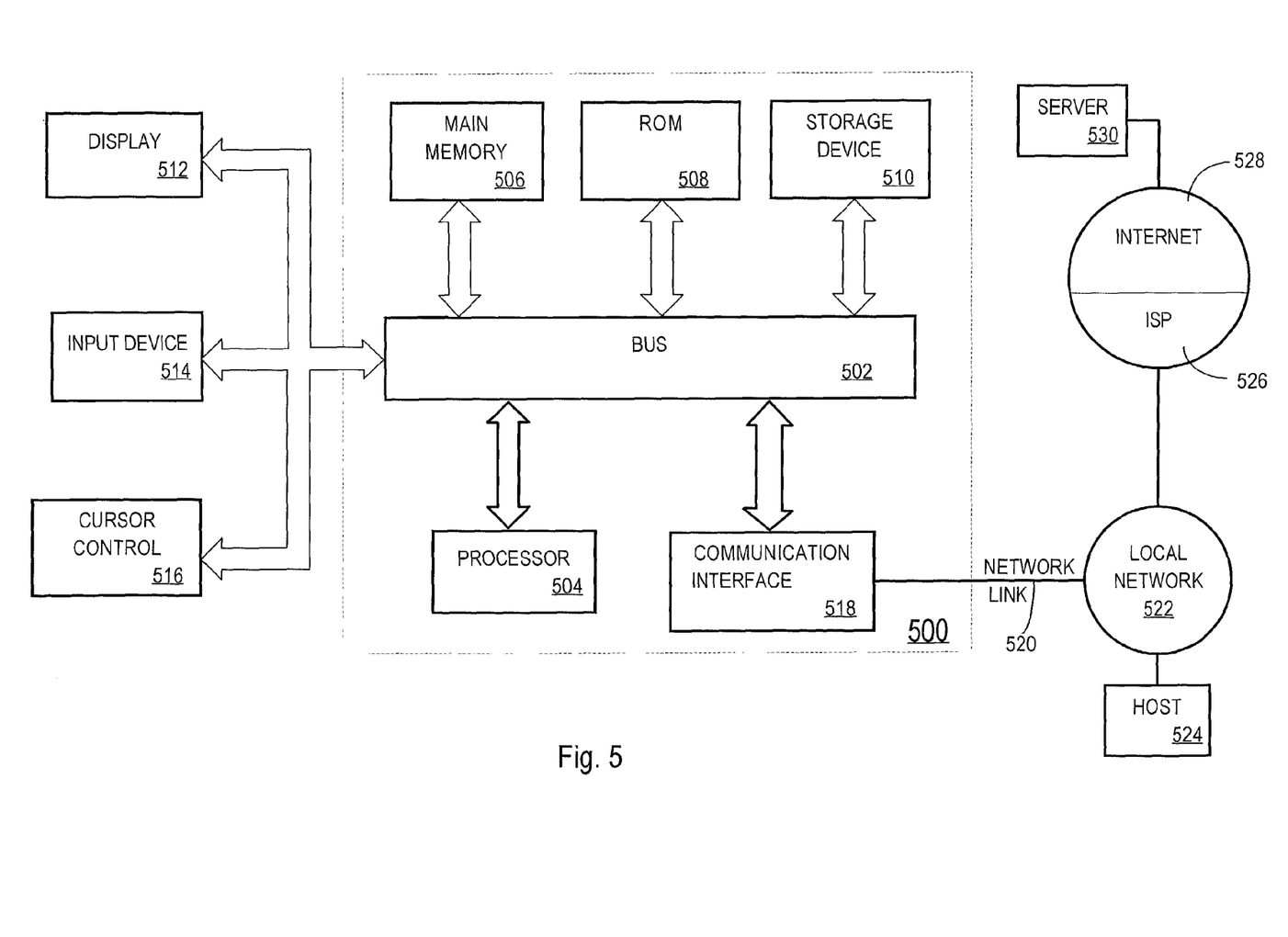
FIG. 5 is a block diagram illustrating a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing parallel operations on a pair of objects in a system that includes a plurality of nodes to enable using an increased degree of parallelism, the method comprising the computer-implemented steps of:
    distributing first-phase partition-pairs of a parallel partition-wise operation on the pair of objects among the plurality of nodes;
    at a particular node of said plurality of nodes, performing the steps of:
        partitioning the one or more first-phase partition-pairs distributed to the particular node to produce a set of second-phase partition-pairs; and
        assigning each second-phase partition-pair from the set of second-phase partition-pairs to a separate slave process.

2. The method of claim 1 wherein the step of assigning each second-phase partition-pair from the set of second-phase partition-pairs to a separate slave process is performed by assigning each second-phase partition-pair from the set of second-phase partition-pairs to a separate slave process within said particular node.

3. The method of claim 1, wherein the parallel partition-wise operation is a parallel full partition-wise operation.

4. The method of claim 1, wherein the parallel partition-wise operation is a parallel partial partition-wise operation.

5. The method of claim 1, wherein the step of partitioning the one or more first-phase partition-pairs and the step of assigning second-phase partition-pairs are performed at each node that has multiple slave processes available for participating in said parallel partition-wise operation.

6. The method of claim 1, further comprising the steps of:
    determining whether a total number of slave processes available for participating in a second parallel partition-wise operation has a particular logical relationship to a number of first-phase partition-pairs of the second parallel partition-wise operation;
    if the total number of slave processes available for participating in the second parallel partition-wise operation has said particular logical relationship to the number of first-phase partition-pairs of the second parallel partition-wise operation, then at said particular node performing the steps of:
        partitioning the one or more first-phase partition-pairs distributed to the particular node for the second parallel partition-wise operation to produce a set of second-phase partition-pairs; and
        assigning the second-phase partition-pairs from the set of second-phase partition-pairs to slave processes within the particular node to cause the number of slave processes participating in said second parallel partition-wise operation on said particular node to be greater than the number of first-phase partition-pairs that were distributed to said particular node;
    if the total number of slave processes available for participating in the second parallel partition-wise operation does not have the particular logical relationship to the number of first-phase partition-pairs of the second parallel partition-wise operation, then distributing said first-phase partition-pairs to slave processes without performing second-phase partitioning.

7. The method of claim 6, wherein the step of partitioning the one or more first-phase partition-pairs and the step of assigning the second-phase partition-pairs are performed at each node that has more slave processes available for participating in said second parallel partition-wise operation than the number of first-phase partition-pairs that are distributed to the node.

8. The method of claim 6, wherein the total number of slave processes available for participating in the second parallel partition-wise operation has the particular logical relationship to the number of first-phase partition-pairs of the second parallel partition-wise operation if the total number of slave processes available for participating in the second parallel partition-wise operation is greater than the number of first-phase partition-pairs of the second parallel partition-wise operation.

9. The method of claim 6, wherein the total number of slave processes available for participating in the second parallel partition-wise operation has the particular logical relationship to the number of first-phase partition-pairs of the second parallel partition-wise operation if the total number of slave processes available for participating in the second parallel partition-wise operation is at least an order of magnitude greater than the number of first-phase partition-pairs of the second parallel partition-wise operation.

10. The method of claim 1, wherein the step of distributing first-phase partition pairs is performed based, at least in part, on node affinity with respect to the one or more first-phase partition-pairs of the parallel partition-wise operation and availability of slave processes for performing the parallel partition-wise operation.

11. A computer-readable medium carrying instructions for performing parallel operations on a pair of objects in a system that includes a plurality of nodes to enable using an increased degree of parallelism, the instructions comprising instructions for performing the computer-implemented steps of:
    distributing first-phase partition-pairs of a parallel partition-wise operation on the pair of objects among the plurality of nodes;
    at a particular node of said plurality of nodes, performing the steps of:
        partitioning the one or more first-phase partition-pairs distributed to the particular node to produce a set of second-phase partition-pairs; and
        assigning each second-phase partition-pair from the set of second-phase partition-pairs to a separate slave process.

12. The computer-readable medium of claim 11 wherein the step of assigning each second-phase partition-pair from the set of second-phase partition-pairs to a separate slave process is performed by assigning each second-phase partition-pair from the set of second-phase partition-pairs to a separate slave process within said particular node.

13. The computer-readable medium of claim 11, wherein the parallel partition-wise operation is a parallel full partition-wise operation.

14. The computer-readable medium of claim 11, wherein the parallel partition-wise operation is a parallel partial partition-wise operation.

15. The computer-readable medium of claim 11, wherein the step of partitioning the one or more first-phase partition-pairs and the step of assigning second-phase partition-pairs are performed at each node that has multiple slave processes available for participating in said parallel partition-wise operation.

16. The computer-readable medium of claim 11, further comprising instructions for performing the steps of:
   determining whether a total number of slave processes available for participating in a second parallel partition-wise operation has a particular logical relationship to a number of first-phase partition-pairs of the second parallel partition-wise operation;
   if the total number of slave processes available for participating in the second parallel partition-wise operation has said particular logical relationship to the number of first-phase partition-pairs of the second parallel partition-wise operation, then at said particular node performing the steps of:
      partitioning the one or more first-phase partition-pairs distributed to the particular node for the second parallel partition-wise operation to produce a set of second-phase partition-pairs; and
      assigning the second-phase partition-pairs from the set of second-phase partition-pairs to slave processes within the particular node to cause the number of slave processes participating in said second parallel partition-wise operation on said particular node to be greater than the number of first-phase partition-pairs that were distributed to said particular node;
   if the total number of slave processes available for participating in the second parallel partition-wise operation does not have the particular logical relationship to the number of first-phase partition-pairs of the second parallel partition-wise operation, then distributing said first-phase partition-pairs to slave processes without performing second-phase partitioning.

17. The computer-readable medium of claim 16, wherein the step of partitioning the one or more first-phase partition-pairs and the step of assigning the second-phase partition-pairs are performed at each node that has more slave processes available for participating in said second parallel partition-wise operation than the number of first-phase partition-pairs that are distributed to the node.

18. The computer-readable medium of claim 16, wherein the total number of slave processes available for participating in the second parallel partition-wise operation has the particular logical relationship to the number of first-phase partition-pairs of the second parallel partition-wise operation if the total number of slave processes available for participating in the second parallel partition-wise operation is greater than the number of first-phase partition-pairs of the second parallel partition-wise operation.

19. The computer-readable medium of claim 16, wherein the total number of slave processes available for participating in the second parallel partition-wise operation has the particular logical relationship to the number of first-phase partition-pairs of the second parallel partition-wise operation if the total number of slave processes available for participating in the second parallel partition-wise operation is at least an order of magnitude greater than the number of first-phase partition-pairs of the second parallel partition-wise operation.

20. The computer-readable medium of claim 11, wherein the step of distributing first-phase partition pairs is performed based, at least in part, on node affinity with respect to the one or more first-phase partition-pairs of the parallel partition-wise operation and availability of slave processes for performing the parallel partition-wise operation.

21. A method for performing parallel operations on a pair of objects including a source object and a target object in a broadcasting operation, the method comprising the computer-implemented steps of:
   mapping each tuple from a source object to a corresponding static partition of a plurality of static partitions of the target object;
   distributing the static partitions among the plurality of nodes according to a node distribution criteria; and
   assigning each static partition to a slave process; and
   broadcasting each tuple only to a group of slave processes assigned to the static partition to which the tuple is mapped.

22. The method of claim 21, wherein the node distribution criteria includes node affinity with respect to the one or more first-phase partition-pairs of the parallel partition-wise operation and availability of slave processes for performing the parallel partition-wise operation.

23. A computer-readable medium carrying instructions for performing parallel operations on a pair of objects including a source object and a target object in a broadcasting operation, the instructions comprising instructions for performing the computer-implemented steps of:
   mapping each tuple from a source object to a corresponding static partition of a plurality of static partitions of the target object;
   distributing the static partitions among the plurality of nodes according to a node distribution criteria; and
   assigning each static partition to a slave process; and
   broadcasting each tuple only to a group of slave processes assigned to the static partition to which the tuple is mapped.

24. The computer-readable medium of claim 23, wherein the node distribution criteria includes node affinity with respect to the one or more first-phase partition-pairs of the parallel partition-wise operation and availability of slave processes for performing the parallel partition-wise operation.

* * * * *